Nov. 29, 1949    A. BESAG ET AL    2,489,612
FRUIT PITTING KNIFE
Filed May 3, 1946
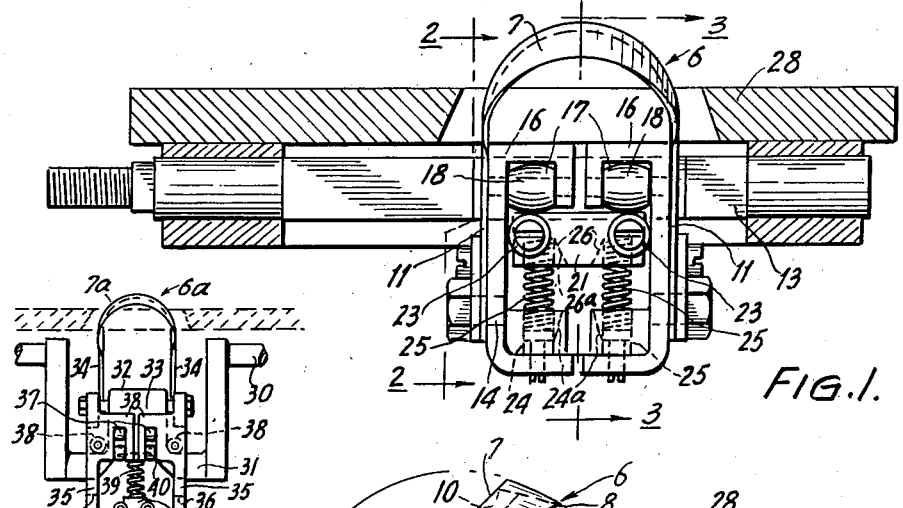
FIG.6.    FIG.1.
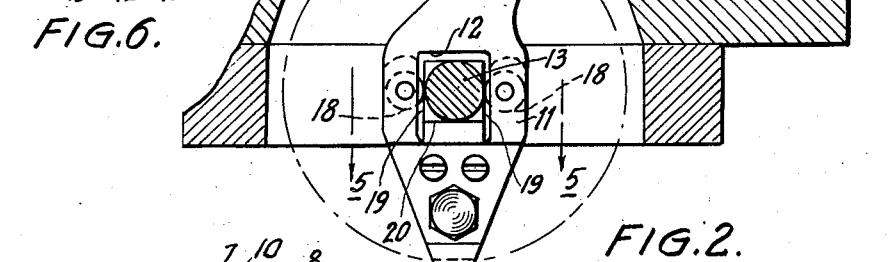
FIG.2.
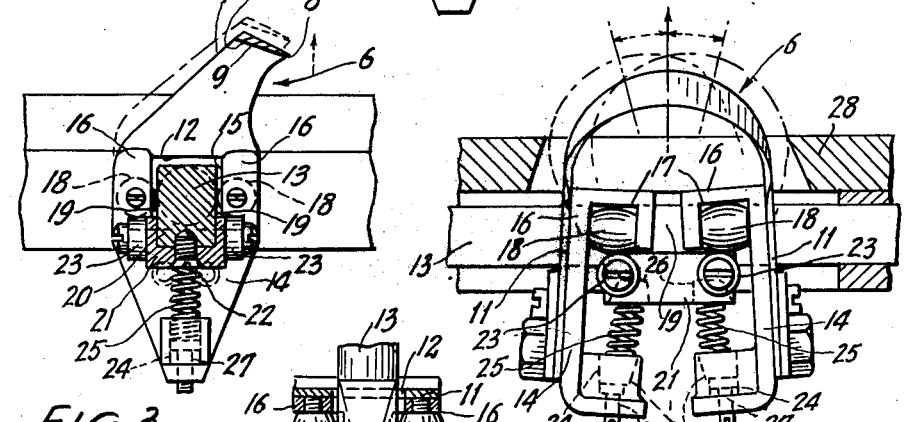
FIG.3.
FIG.5.    FIG.4.
INVENTORS:
Arnold Besag and Otto Theodore Goetz
BY
Richard y Geier
ATTORNEYS Patented Nov. 29, 1949

2,489,612

UNITED STATES PATENT OFFICE 2,489,612

FRUIT PITTING KNIFE

Arnold Besag, East Malvern, Victoria, and Otto Theodore Goetz, Spotswood, Victoria, Australia Application May 3, 1946, Serial No. 666,986
In Australia May 16, 1945

4 Claims. (Cl. 146—28)

This invention relates to fruit pitting knives used in conjunction with machines for preparing fruit such as peaches for preserving or like processing.

The nature of the stone or kernel of the peach and the varying sizes of the fruit and stone present many difficulties in providing an effective mechanical operation for splitting or halving of the fruit and removal of the stone in the pitting operation.

It is well known that the size of the peach stone is not relative to the size of the fruit in that large fruit may have a large or a small stone and small fruit may similarly produce either large or small stones. Consequently in any batch of fruit to be pitted, whether graded or otherwise, numerous shapes and sizes of stones will be encountered.

If the pitting knife is designed to remove the largest size stone, likely to be met, and at the same time remove the woody part of the flesh surrounding such stone, the knife will on pitting a peach having a small stone remove an excessive amount of edible flesh with consequent waste.

It has been proposed to employ flexible pitting blades in the form of wire loops or ribbon blades having an inherent flexibility permitting the blade to adjust itself to the contour of the stone and thereby remove a minimum of fruit flesh with the stone. Such pitting blades are impracticable for the reason that no provision is made for removing the woody portion of the fruit flesh surrounding the stone and such knives lack the requisite strength to meet any unusual obstruction as for example when a peach is incorrectly fed to the machine by an operator and the peach incorrectly halved.

In another known form of pitting knife the blade is formed in two independently pivotally mounted halves, but as the peach stones encountered are neither symmetrical nor always symmetrically positioned relatively to the pitting knife, the two halves of the latter will in a number of cases expand or move about their pivotal mountings to a different degree and thereby result in stepped cuts in the peach flesh which are rejects as far as first quality canned peaches are concerned.

It has also been proposed to pivotally attach a single arched pitting blade to its driving shaft with a resilient mounting for the knife to enable the latter to increase its depth of cut when urged by the contour of a large stone, the blade simultaneously having imparted thereto an oscillatory movement about its pivot. One disadvantage of this form of pitting knife is that no adequate provision is made for a wide shallow stone. Such knife has to be made wide enough to accomodate the widest stone otherwise it will cause possible damage to the knife, and when wide enough for such stones will effect a considerable loss of fruit flesh with small and average size stones.

The principal objective of the present invention is to provide an improved pitting knife for removing the stones or pits from previously halved fruit in which the knife operates with a self-adjusting action determined by and independently of the size and/or contour of the stone whereby a minimum amount of fruit flesh is removed with the stone.

With the above stated objective in view, a fruit pitting knife, according to this invention, comprises an oscillatable drive shaft having reciprocal rotation, a flexible arched or bowed pitting blade free at each end drive connected with the oscillatable drive shaft and freely movable radially in relation to the drive shaft and freely expandable laterally responsive to the contours of a fruit stone.

In the construction stated radial movement of the pitting blade enables the blade in operation to effect a movement responsive to the rounded contour of the fruit stone while the resiliently expandable lateral movement enables the blade to automatically follow the side contour of a wide stone. The resilient means controlling the radial movement, maintains the blade in contact with the stone during the pitting operation and returns the blade to normal position. The resiliency of the blade returns the extending side portions thereof to normal after expansion.

The cutting portion of the blade is preferably sharpened on its leading edge and the inner surface adapted to contact the fruit stone tapers downwardly whereby the cutting edge is maintained a desired distance away from the surface of the stone whereby the woody flesh adjacent a peach stone, for example, is removed during the cutting movement of the knife.

Furthermore, the expanding movements of the extending side portions of the blade do not cause any appreciable variations to the radial movements of the blade whereby the blade in all movements responsive to the contours of the stone closely follows the said contours to thereby remove a minimum of edible fruit flesh during the pitting operation.

The accompanying drawings illustrate one practical embodiment of a fruit pitting knife, in accordance with the present invention, and adapted for removing the stones from halved peaches.

In these drawings—

Fig. 1 is a view in front elevation of the knife mounted in operative position on a pitting plate.

Fig. 2 is a sectional elevation on the line 2—2 of Fig. 1, and—

Fig. 3 is a view in section on the line 3—3 of Fig. 1.

Fig. 4 is a view in front elevation showing the lateral expanding movements of the knife blade, and—

Fig. 5 is a view in section on line 5—5 of Fig. 2.

Fig. 6 is a view in front elevation of a modified construction in which the pitting knife is movable on a cranked drive shaft.

In the drawings the pitting knife 6 is a flexible steel blade 7 of usual arched formation and having a forward cutting edge 8. The under surface 9 of the blade 7 is ground to taper from the cutting edge 8 rearwardly to rear under edge 10 so that said edge 10 actually contacts the outer surface of a peach stone during operation. The cutting edge 8 thereby cuts a required distance into the peach flesh adjacent the stone whereby the woody flesh adjacent the stone is removed during the pitting operation, and will adhere to the pitted stone.

Extending side portions 11 of the blade 7 have apertures 12 therein through which latter the rigid drive shaft 13 extends. Secured to the side portions 11 are forked brackets 14, the fork slot 15 of which register with the apertures 12.

Each fork end 16 of the brackets 14 are slotted as at 17 in which the spindles of rollers 18 are journalled. Pairs of rollers 18 on each end 16 of bracket 14 are arranged to bear against surfaces 19 formed on opposite sides of a lug 20 formed on the drive shaft 13. The disposition of rollers 18 and ends 16 of brackets 14 on either side of the lug 20 formed on the shaft 13 form a drive connection between the said shaft and blade 7.

A grooved extension or saddle piece 21 of the lug 20 is secured in position by screw 22, the sides of extension 21 having secured thereto stop rollers 23 adapted to act as stops for rollers 18 when in normal position as illustrated in Figs. 1 and 3.

The lower ends of brackets 14 are formed with recesses 24, each receiving respectively one end of a pair of compression springs 25, the upper ends of springs 25 each seat in a recess 26 in the extension 21 of lug 20.

The recesses 24 are provided with adjustable studs 27 by means of which the compression of springs 25 may be adjusted. The springs 25 exert pressure between the lower ends of brackets 14 and underside of extension 21 on lug 20 so that the rollers 18 are normally pressed against the stop rollers 23.

The spring receiving recesses 24 and 26 are provided with inclined sides as 24a and 26a which enable the springs 25 to assume an inclined position during expanding movement of the blade 7.

In Figs. 1 to 4 of the drawings the knife as illustrated is mounted in known manner in operative position below a pitting table 28, the drive shaft 13 being supported in bearings 29, a drive coupling for said drive shaft is not shown as being unnecessary.

In use of the knife the blade 7 is set or adjusted relatively to the pitting table 28 to remove in a required manner, a small size stone likely to be met in a batch of peaches to be processed.

The rollers 18, bearing surfaces 19, brackets 14, springs 25 and disposition of the shaft 13 through apertures 12 form guide means which control the radial movements and lateral expansion of the blade.

In operation the shaft 13 and blade 7 are oscillated and if a stone is higher or longer than normal the blade 7 will yield in a radial direction, thus increasing the radius of the cutting sweep of the blade as required by the rear under edge 10 of the blade closely following the contours of the stone. On so doing the rollers 18 slide along the surfaces 19 of lug 20 in the drive shaft 13. The blade 7 is returned to normal position by the compression springs 25, after movement of the blade induced by the contours of a stone.

Similarly, if a stone which is wider than normal is encountered, the sides 11 of the blade 7 can expand laterally in a direction parallel to the axis of the drive shaft 13. This is achieved by the resiliency of the flexible blade 7, whereby it returns automatically to normal position after having been expanded by an over-wide stone.

Axial displacement or complete movement of the knife assembly is prevented by the stop rollers 23 along which latter the sides 11 of the blade 7 slides when moving in a radial direction without being simultaneously expanded laterally in the manner shown in Fig. 4. Should lateral expansion occur, the blade 7 will float freely, controlled only by the contours of the stone, and will automatically return to the normal position immediately the outside contours of the stone ceases to exert any pressure upon the blade 7.

Any expanding movements of the blade 7 do not effect radial movements as both movements of the blade may occur separately or together so that the blade is at all times free to adjust itself to the contours of the stone being pitted. Furthermore the mounting of the blade 7 will enable the latter to rock and thereby accommodate itself to a stone which is incorrectly aligned with the blade. Such rocking movement may occur during radial movement and/or lateral expansion of the blade.

Illustrated in Fig. 6 a modified construction is shown in which the pitting knife 6a is mounted on a cranked driving shaft 30. The cranked portion 31 of the shaft 30 is provided with a lug 32 having bearing surfaces 33 formed on opposite faces thereof.

The blade 7a is provided with extending side portions 34 having brackets 35 attached thereto, said brackets being provided with apertures 36 through which latter the cranked portion 31 of the shaft extends. The lug 32 is positioned between the said brackets and pairs of rollers 37 are carried in projections 38 formed in the brackets 35 so that the pairs of rollers 37 bear on the surfaces 33 on lug 32. Stop rollers 38a are carried on the brackets 35 to engage the cranked portion 31 of shaft 30 when the blade is returned to normal position by a compression spring 39 supported between a recess 40 formed in the crank 31 below lug 32 and a carriage 41 supported by spaced rollers 42 bearing on inwardly projecting portions 43 formed at lower ends of brackets 35.

The operation of the modified construction is similar to that described in reference to Figs. 1 to 5, excepting that the mounting on the crank 31 provides the knife 7a with movement through an arc which will more closely approximate the general longitudinal contour of a peach stone.

During lateral expansion movements of the blade 7a the end portions 43 of brackets 35 separate with rolling engagement with rollers 42 whereby the radial movements of the blade are under influence of spring 39.

We claim:

1. A fruit pitting knife comprising an oscillatable drive shaft having a portion of rectangular section with parallel sides, a bowed resiliently flexible pitting blade, parallel extensions integral with and positioned on opposite sides of said blade, guide supports secured to the parallel extensions, rectangularly formed apertures in the parallel extensions and the guide supports freely accommodating the rectangular section portion of the oscillatable drive shaft and permitting radial movement and resilient axial expansion of said pitting blade relatively to said drive shaft, at least one spring opposing the radial movement interposed between the guide supports and said rectangular portion, stops maintaining said pitting blade in a normal position, and guide members on the guide supports engaging the parallel sides of said rectangular portion and drive connecting said drive shaft and said pitting blade.

2. A fruit pitting knife comprising an oscillatable drive shaft, a portion of rectangular section formed on the drive shaft, a bowed resiliently flexible pitting blade, integral lateral prolongations on said pitting blade, a bracket secured to each lateral prolongation, slotted openings formed in alignment in the lateral prolongations and said brackets freely accommodating the rectangular portion of the oscillatable drive shaft and permitting radial movement and resilient axial expansion of said pitting blade relatively to said drive shaft, guide rollers rotatably supported on said brackets and engaged with opposite sides of said rectangular portion to form a drive connection between said drive shaft and said pitting blade, a saddle piece secured to the rectangular portion of said drive shaft, springs interposed between the saddle piece and said brackets and opposing the radial movement of said pitting blade, and supporting rollers rotatably mounted on the saddle piece and comprising supports for the guide rollers on said brackets.

3. A fruit pitting knife as claimed in claim 2 having forks at one end of the brackets, journals in the forks whereon the guide rollers are rotatably mounted, and recesses in the opposite ends of the brackets and in the saddle piece to receive the ends of the springs interposed between said brackets and saddle piece.

4. A fruit pitting knife comprising an oscillatable drive shaft, an offset part in the cranked portion parallel with the oscillatable drive shaft, an inward radial extension on the offset part, a bowed resiliently flexible pitting blade, integral lateral prolongations on said pitting blade, brackets secured to and forming extensions of the lateral prolongations, openings in the brackets through which said offset part freely extends, guide rollers rotatably supported on the brackets and engaging the inward radial extension to form a drive connection between said extension and said brackets whereby the oscillatable drive shaft actuates said pitting blade, supporting rollers rotatably mounted on the brackets and engaging said offset part, a roller supported carriage carried by the brackets, and at least one spring interposed between said carriage and the offset part.

ARNOLD BESAG.
OTTO THEODORE GOETZ.

REFERENCES CITED

The following references are of record in the file of this patent:

UNITED STATES PATENTS

| Number | Name | Date |
|---|---|---|
| 1,483,676 | Petersen | Feb. 12, 1924 |
| 1,566,463 | Bem | Dec. 22, 1925 |
| 1,581,482 | Bem | Apr. 20, 1926 |
| 1,617,909 | Jepson | Feb. 15, 1927 |
| 1,941,874 | Bem | Jan. 2, 1934 |